Apr. 3, 1923. 1,450,453.
H. RASCHE.
AUTOMOBILE CHAIN FASTENER AND TIGHTENER.
FILED APR. 15, 1922.

H. Rasche, Inventor

By C. A. Knowles, Attorneys

Patented Apr. 3, 1923.

1,450,453

UNITED STATES PATENT OFFICE.

HUGO RASCHE, OF PRINCETON, IOWA.

AUTOMOBILE CHAIN FASTENER AND TIGHTENER.

Application filed April 15, 1922. Serial No. 553,243.

*To all whom it may concern:*

Be it known that I, HUGO RASCHE, a citizen of the United States, residing at Princeton, in the county of Scott and State of Iowa, have invented a new and useful Automobile Chain Fastener and Tightener, of which the following is a specification.

This invention aims to provide novel means for holding releasably against relative swinging movement, the pivotally connected parts of a chain fastener.

Figure 1:
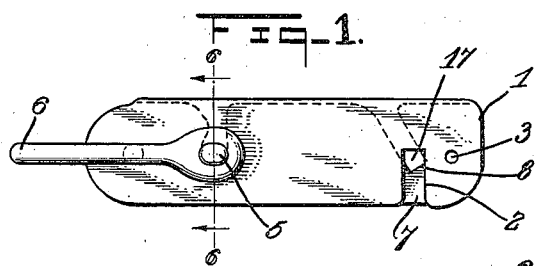
Figure 2:
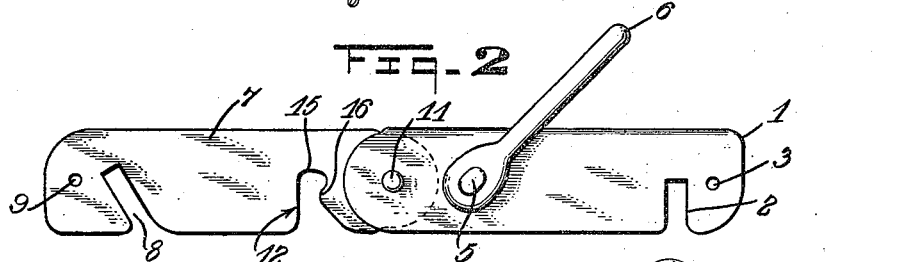
Figure 3:
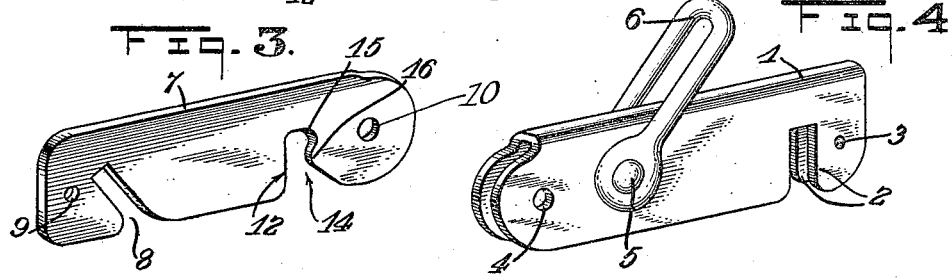
Figure 4:
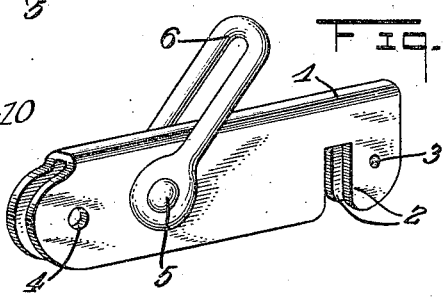
Figure 5:
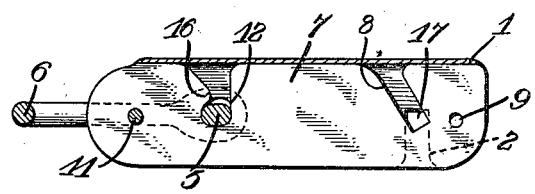
Figure 6:
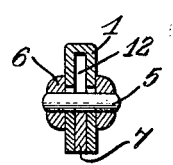

Figure 1 is a side elevation showing the fastener closed; Figure 2 is a side elevation showing the fastener open; Figure 3 is a perspective view disclosing the auxiliary member of the fastener; Figure 4 is a perspective view wherein the main member of the fastener appears; Figure 5 is a side elevation wherein parts are broken away; Figure 6 is a section on the line 6—6 of Figure 1.

The device forming the subject matter of this application comprises a trough-shaped main member 1 provided adjacent to one end with oppositely disposed notches 2 located at right angles to the length of the member 1, the said member being supplied with oppositely disposed openings 3, located between the notches 2 and said end of the member 1. Adjacent to its opposite end, the member 1 has oppositely disposed openings 4. A latch-shaft 5 is journaled in the member 1 between the openings 4 and the notches 2. A connecting element for a chain (not shown), and preferably in the form of a bail 6, straddles the member 1 and is secured to the ends of the latch shaft 5. The latch shaft 5 is of unequal transverse dimensions.

An auxiliary member 7 is provided and is supplied with a notch 8 which is so located that it slants toward the free end of the member 7 when the fastener is closed as shown in Figure 1. Outwardly of the notch 8, the member 1 has an opening 9, disposed adjacent to one end of said member. An opening 10 is formed in the member 7 adjacent to the other end thereof. Said end of the member 7 is received in the member 1, and through the openings 4 and 10, a pivot element 11 passes. The member 7 is provided with a second notch 12 disposed between the opening 10 and the notch 8. The notch 12 includes a flared mouth 14, a seat 15 which is elongated in the direction of the length of the member 7, and a reduced neck 16 connecting the mouth and the seat.

The pivotally connected members 1 and 7 are foldable to lie side by side, when the device is closed as shown in Figure 1, the member 7 fitting within the member 1. The notches 2 and 8 of the members 1 and 7 cooperate to form a retaining opening 17 for a chain (not shown) when the device is closed, and because the notch 8 slants toward the free end of the member 7, the pull on the chain tends to prevent the members 1 and 7 from swinging open on the pivot element 11. When the device is open, as disclosed in Figure 2, the connecting element 6 is disposed at an angle to the member 1, and, when the member 7 is swung from the open position of Figure 2, to the closed position of Figure 1, the latch-shaft 5 enters the seat 15 by way of the mouth 14 and the neck 16. The connecting member 6 then is swung until it extends in a direction substantially parallel to the length of the fastener, the latch shaft 5 being rotated until its longer transverse dimension is substantially parallel to the length of the fastener, the latch shaft being retained in the seat 15, and the members 1 and 17 being held against swinging open on the pivot element 11, the connecting element 6 being adapted to receive one end of the chain. The openings 3 in the member 1 are alined with the opening 9 in the member 7 when the device is closed, and through these alined openings, a locking device of any desired sort (not shown) may be inserted, should an unusual degree of security be desired.

What is claimed is:—

A device of the class described comprising pivotally connected main and auxiliary members which are foldable to lie side by side when the device is closed, said members being provided in their edges with oppositely extended notches which cooperate to form a retaining opening when the device is closed, a latch-shaft mounted to rock in the main member and of unequal transverse dimensions, and a connecting element carried by the shaft and constituting means for rocking the shaft, the auxiliary member being provided with a notch comprising a neck and a seat at the inner end of the neck, the seat being elongated in the direction of the length of the auxiliary member, the latch shaft entering the seat, by way of the neck, when said members are folded to closed position and when the connecting element is disposed at an angle to the main member, the latch-shaft engaging in the seat, to hold said members together, when the connecting element extends in a direction substantially parallel to the length of the device.

In testimony that I claim the foregoing as my own, I have hereto affixed my signature.

HUGO RASCHE.